US006717599B1

(12) United States Patent
Olano

(10) Patent No.: US 6,717,599 B1
(45) Date of Patent: Apr. 6, 2004

(54) METHOD, SYSTEM, AND COMPUTER PROGRAM PRODUCT FOR IMPLEMENTING DERIVATIVE OPERATORS WITH GRAPHICS HARDWARE

(75) Inventor: Thomas M. Olano, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 154 days.

(21) Appl. No.: 09/606,988

(22) Filed: Jun. 29, 2000

(51) Int. Cl.[7] .................................. G09G 5/00
(52) U.S. Cl. ...................... 345/853; 345/764
(58) Field of Search ................. 345/419, 440, 345/426, 589, 581, 582, 584, 764, 853

(56) References Cited

U.S. PATENT DOCUMENTS 6,252,608 B1 * 6/2001 Snyder et al. ............. 345/426

OTHER PUBLICATIONS

Mark Peercy et al., "Accelerated Programmable Shading," paper copy of slide presentation distributed at *GDCHardCore Technical Seminar—Programming for 21st Century Games: Graphics,* Dec. 1999, San Francisco, CA, 19 sheets.
Paul S. Strauss and Rikk Carey, "An Object–Oriented 3D Graphics Toolkit," *Computer Graphics,* vol. 26, No. 2, ACM Press, Jul. 1992, pp. 341–349.
Steve Upstill, *The RenderMan™ Companion: A Programmer's Guide to Realistic Computer Graphics,* Addison–Wesley Publishing Company, 1990, Reading, Massachusetts, pp. ix–xiii and 287–332.

Christopher W. Fraser et al., "Engineering a Simple, Efficient Code–Generator Generator," *ACM Letters on Programming Languages and Systems,* vol. 1, No. 3, ACM Press, Sep. 1992, pp. 213–226.

Larry Gritz and James K. Hahn, "BMRT: A Global Illumination Implementation of the RenderMan Standard," *Journal of Graphics Tools,* vol. 1, No. 3, A.K. Peters, Ltd., 1996, pp. 29–47.

Pat Hanrahan and Jim Lawson, "A Language for Shading and Lighting Calculations," *Computer Graphics,* vol. 24, No. 4, ACM Press, Aug. 1990, pp. 289–298.

* cited by examiner

*Primary Examiner*—Matthew Luu
(74) *Attorney, Agent, or Firm*—Woodcock Washburn LLP

(57) ABSTRACT

Method, system, and computer program product for implementing derivative operators at an interactive rate in computer graphics systems. In an embodiment, a data structure representing the operation of one or more computer program statements is received by a compiler and transformed into a tree data structure. Nodes of the tree data structure that determine derivative information are marked, and a transform rule is applied to the marked nodes to transform the tree data structure into a data structure that can be implemented with graphics hardware interface program statements. In one embodiment of the invention, the compiler transforms shading language statements into graphics application programming interface statements that can be implemented with multiple passes through a graphics pipeline. It is a feature of the present invention that it can be implemented on a wide range of computer graphics systems.

14 Claims, 10 Drawing Sheets

METHOD, SYSTEM, AND COMPUTER PROGRAM PRODUCT FOR IMPLEMENTING DERIVATIVE OPERATORS WITH GRAPHICS HARDWARE

BACKGROUND OF THE INVENTION

1. Field of the Invention

The present invention relates to computer graphics. More particularly, it relates to implementing derivative operators with graphics hardware.

2. Related Art

Computer graphics systems are used to render all kinds of objects for display. In general, it is important that objects rendered for display appear as realistic to a viewer as possible. This is particularly the case, for example, in computer graphics imagery (CGI) for use in motion pictures and animation. In many applications, it is also important that the computer graphics system used to render objects for display operate at an interactive rate. As would be known to a person skilled in the relevant art, programmable shading can be used to render objects that appear very realistic to a viewer, but programmable shading cannot be implemented at an interactive rate in most, if not all, available computer graphics systems.

Programmable shading involves the use of a special programming language known in the relevant art as a shading language. A shading language is used to specify the appearance and surface characteristics of objects in an image or a scene. See Pat Hanrahan's and Jim Lawson's "A language for Shading and Lighting Calculations," in *Computer Graphics* (SIGGRAPH '90 *Proceedings*) Vol. 24, pp. 289–94, which is herein incorporated by reference in its entirety, for a description of a shading language. A typical shading language can simulate a wide variety of appearances including, for example, wood, metal, plastic, fabric, glass, hair, skin, et cetera. A shading language can also be used to describe the emission characteristics of light sources in a scene, the color and reflective properties of each object in a scene, and the transmittance properties of atmospheric media. In many CGI applications, the appearance and surface characteristics of every object in a scene are described using a shading language. As would be known to a person skilled in the relevant art, programmable shading plays an important role in the creation of special effects for movies and television. Programmable shading also plays an important role in other applications as well, for example, in engineering and scientific applications for visualization of data.

A key feature of most shading languages is the ability to implement derivative operators. A derivative operator is a function that returns a derivative value. Derivative operators are used in computer graphics. For example, derivative operators are used for determining surface normals, for determining noise frequency limits, and for antialiasing. Implementing derivative operators can be a significant task in computer graphics. Calculating derivatives can consume a significant amount of the total processing time needed to render an image. Using a shading language to implement derivative operators, however, significantly simplifies the task.

A typical application program accesses shading language procedures, including derivative operators, through a programmable interface extension of a graphics application programming interface (graphics API). As would be known to a person skilled in the relevant art, a shading language is basically a library of procedures, known in the relevant art as shaders, that can be called during the rendering of an image. A shading language procedure can have very general programing constructs such as loops, conditional statements, and functions. In some examples, shading language source files (i.e., procedures) are compiled to produce object files. When a scene description using a shading language is being rendered, an object file corresponding to a shader must be retrieved from a library and loaded into the memory of the computer graphics system being used to render the scene. The object file must then be executed by the graphics system's general purpose processor in order to produce the desired effects in the rendered scene.

The known methods used to implement shading language procedures, including derivative operators, place a significant burden on the graphics hardware and driver software of computer graphics systems. Graphics hardware is generally designed to support a parametric appearance model. For example, Phong lighting is evaluated per vertex with one or more texture maps applied after Gouraud interpolation of the lighting results. Graphics hardware is not designed to support the general programming constructs of a shading language. Therefore, known shading language procedures such as, for example, shading language derivative operators are translated into a general purpose programing language and compiled to run on a general purpose processor. Because general purpose processors are not designed to process millions of pixels each second, as are special purpose graphics processors and graphics hardware, the known methods used to implement shading language procedures cannot be implemented at an interactive rate on most, if not all, available computer graphic systems.

What is needed is a method, system, and computer program product for implementing derivative operators at an interactive rate in computer graphics systems. In particular, what is needed is a method, system, and computer program product for implementing derivative operators with graphics hardware.

SUMMARY OF THE INVENTION

The present invention provides a method, system, and computer program product for implementing derivative operators at an interactive rate in computer graphics systems. In an embodiment, a data structure representing the operation of one or more computer program statements is received by a compiler and transformed into a tree data structure. Nodes of the tree data structure that determine derivative information are marked. A transform rule is applied to the marked nodes to transform the tree data structure into a data structure that can be implemented with graphics hardware interface program statements. In one embodiment of the invention, the compiler transforms shading language statements into graphics application programming interface statements that can be implemented with multiple passes through a graphics pipeline. It is a feature of the present invention that it can be implemented on a wide range of computer graphics systems.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the relevant art(s) to make and use the invention.

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Overview and Terminology

The present invention provides a method, system, and computer program product for implementing derivative operators at an interactive rate in computer graphics systems. In one embodiment of the invention, a compiler transforms shading language statements into graphics API statements that can be implemented with multiple passes through a graphics pipeline. It is a feature of the present invention that it can be implemented on a wide range of available computer graphics systems including, but not limited to, a general purpose computer having a graphics processor (single chip or multiple chip), a specially designed graphics computer, a graphics machine, a parallel processing graphics machine, a graphics card, graphics hardware, a graphics accelerator, a computer network architecture, et cetera.

As used herein, the term "interactive rate" refers to a rate at which images can be rendered without undue delay upon a user or application. This interactive rate can include, but is not limited to, a pixel fill rate of approximately 400 million pixels/sec or 6.66 million pixels/frame at 60 Hz. In an embodiment, this rate is equal to approximately 200 million pixels/sec or 3.33 million pixels/frame at 60 Hz. These example interactive rates are illustrative. Slower or faster interactive rates may be implemented.

Figure 1:
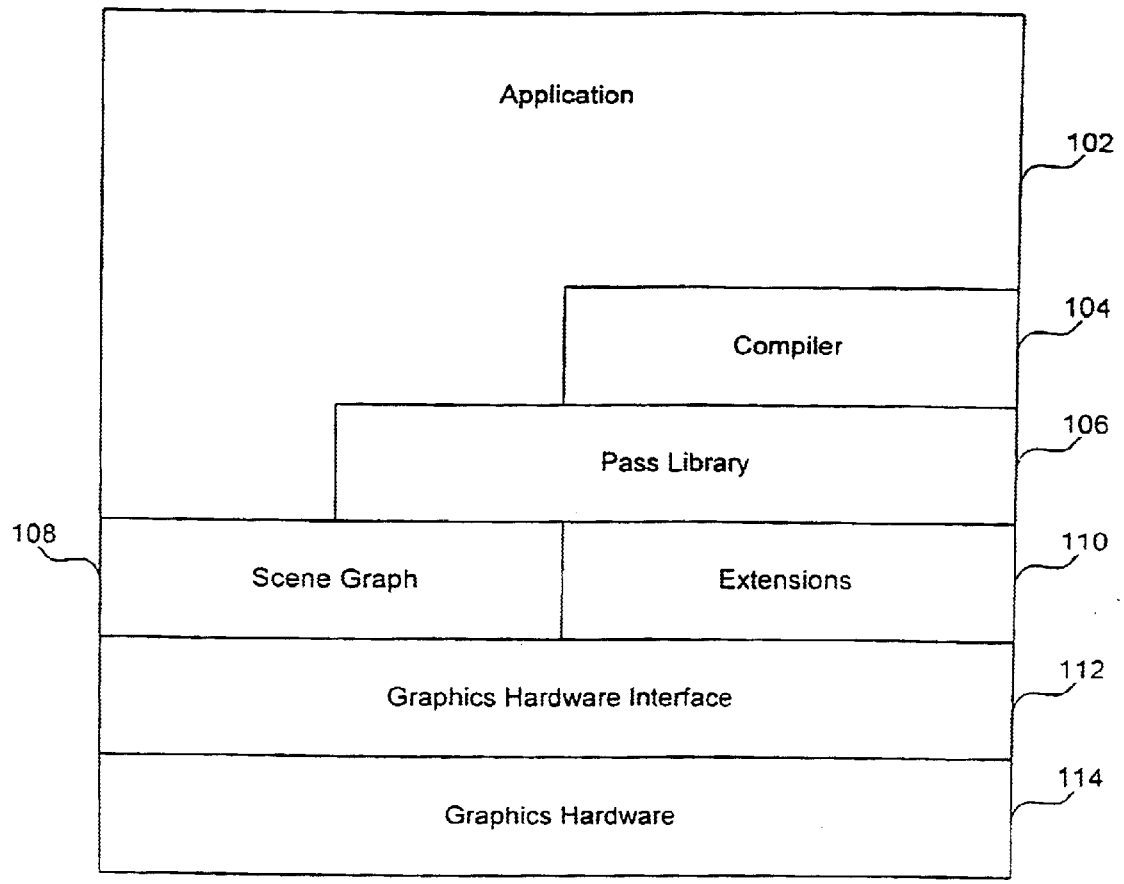
FIG. 1 illustrates an example embodiment of a computer architecture in which the present invention can be implemented.

Example Systems for Implementing Derivative Operators According to the Present Invention It is a feature of the present invention that it may be implemented in many different ways, in many environments, and on many different computers graphics systems. For example, FIG. 1 illustrates a block diagram of an example computer graphics architecture 100 in which the present invention can be implemented.

Architecture 100 may be viewed as comprising five layers. These layers are the application program layer, the compiler layer, the graphics toolkit layer, the graphics API layer, and the graphics hardware layer. Some or all of the layers of architecture 100 will be available in any graphics system.

The application program layer comprises application 102. Application 102 represents any high level application. For example, application 102 might be a program for rendering computer graphics imagery to be used in a movie, or a program for visualization of scientific data. Application 102 will typically allow a user, for example, a movie technical director or a scientist, to describe images or scenes using a high level programming language or a shading language, which causes object files residing at the graphics toolkit layer and/or the graphics API layer to be executed by the graphics system embodying architecture 100.

The compiler layer comprises compiler 104. Compiler 104 transforms high-level program statements, e.g., shading language derivative operator statements, into graphics toolkit layer or graphics API layer statements. Compiler 104 can be implemented so that it transforms high level or shading language statements into statements that are supported by standard graphics hardware. This embodiment ensures maximum compatibility with graphics systems. Alternatively, compiler 104 can be implemented so that it will transform high level statements into statements designed to take advantage of specialized graphics hardware available in a particular graphics system, thereby optimally transforming high level statements to run on a particular graphics system.

The graphics toolkit layer comprises pass library 106, scene graph 108, and extensions 110. Pass library 106, scene graph 108, and extensions 110 are libraries or databases containing programming objects that can be used to simplify graphics programming tasks. Collectively, pass library 106, scene graph 108, and extensions 110 make up a graphics toolkit. For an explanation of what a graphics toolkit is and how it is used, see Strauss et al., *An Object-Oriented* 3D *Graphics Toolkit*, Computer Graphics, 26(2) July 1992, pp. 341–349, incorporated in its entirety herein by reference.

The graphics API layer comprises graphics hardware interface 112. Graphics hardware interface 112 is a software interface to the graphics hardware of architecture 100. Graphics hardware interface 112 comprises, for example, a graphics API, which can include but is not limited to OPENGL, and/or other system support such as operating system support and/or windowing system support.

The graphics hardware layer comprises graphics hardware 114. Graphics hardware 114 can be any hardware, graphics hardware, or graphics pipeline including, but not limited to, a computer graphics processor (single chip or multiple chip), a specially designed graphics computer, an interactive graphics machine, a network architecture, et cetera.

Figure 2:
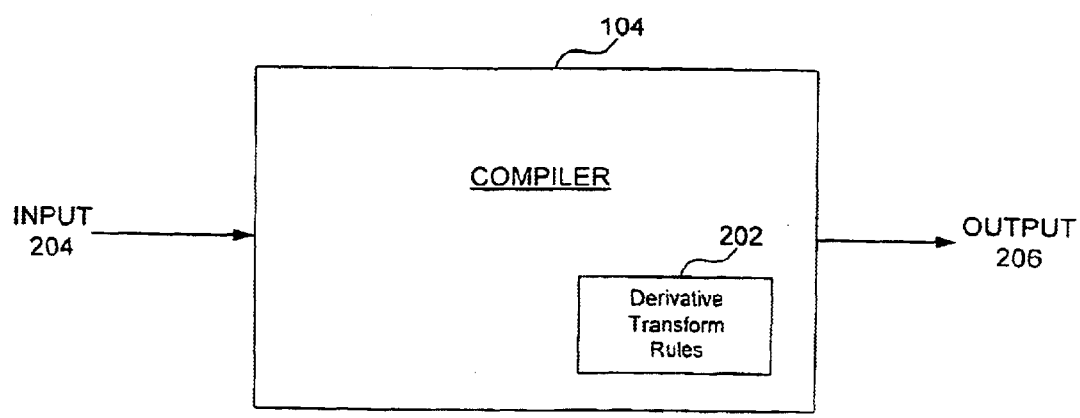
FIG. 2 illustrates a block diagram of an example compiler according to the present invention.

FIG. 2 illustrates a block diagram of an example compiler 104 according to an embodiment of the present invention. Compiler 104 transforms high level programming statements, for example, shading language derivative operators, into graphics API layer statements (i.e., multiple passes through a graphics pipeline) or into graphics toolkit layer statements, which in turn are transformed into graphics API statements. In one preferred example, compiler 104 can be implemented in either software and/or firmware.

As shown in FIG. 2, compiler 104 comprises a set of derivative transform rules 202 that are applied to an input 204 to produce an output 206. In an embodiment, input 204 is a text file containing one or more shading language derivative operator statements and/or one or more statements that require derivative information. Input 204 is converted into a tree data structure representation by compiler 104. The nodes of the tree data structure representation are then converted into graphics API statements that can be implemented with one or more passes through a graphics pipeline. Compiler 104 is similar to a compiler for a complex instruction set computer because graphics API statements are similar to complex instructions. One difference is that compiler 104 does not generally consider scheduling issues because there is no overlap between rending passes through a graphics pipeline.

In another embodiment, input 204 can be pre-processed, for example by a module of application 102, so that it is provided to compiler 104 in the form of a tree data structure.

In an embodiment of the present invention, where input 204 is in the form of a tree data structure, compiler 104 produces output 206 by producing fast tree-matching code using derivative transform rules 202. In this embodiment, compiler 104 operates in a manner similar to the iburg code generation tool described by Fraser et al. in *Engineering a Simple, Efficient Code Generator Generator*, AMC Letters on Programming Languages and Systems, 1, 3 (September 1992), 213–226, which is hereby incorporated herein in its entirety.

In an embodiment, derivative transform rules 202 comprise a text file containing a plurality of pattern match rules or patterns to match. Matching happens by marking and reducing the data structure of input 204. The marking (or labeling) of the nodes of input 204 that require derivative information is done bottom-up through the tree using dynamic programming to find a least-cost set of pattern match rules. Reducing input 204 is done top-down, using the pattern match rules, with one semantic action run before a marked node's children are reduced and one run after. The number of passes through a graphics pipeline that are required to implement input 204 is used to represent cost and thus determine a least-cost set of pattern match rules.

Storing pattern match rules in a text file allows the match rules to be readily edited or changed. By changing the match rules, compiler 104 can be quickly and flexibly reconfigured to operate with a different set of high level programming statements or shading language statements or with different graphics hardware. Editing or changing the pattern match rules and the costs determination for compiler 104 enables compiler 104 to transform any set of high level statements, e.g., shading language derivative operators, into graphics API statements (i.e., multiple passes through a graphics pipeline). This embodiment of the invention can take full advantage of any specialized graphics hardware that may be present in a particular graphics system, and thus optimally transforming high level statements for implementation on a particular graphics system.

In another embodiment of the present invention, derivative transform rules 202 are stored in firmware (or hardware) rather than software. This embodiment of the present invention can be effectively implemented in graphic systems where the flexibility of reconfiguring compiler 104 is not a requirement or where there is an overriding need to ensure that the derivative transform rules are not altered.

It is a feature of the present invention that it permits the continued use of shading language statements previously developed by application users. When an application 102 written using shading language statements is input to compiler 104, compiler 104 transforms the shading language statements into graphics API statements, thereby eliminating the need to for application 102 to access shading language procedures, e.g., derivative operators, through the programmable interface extension of graphics hardware interface 112.

It is another feature of the present invention that it permits the graphics hardware 114 and/or graphics hardware interface 112 to be upgraded or replace without impacting application 102 and any files for use with application 102. This feature also makes application 102 and any files created using application 102 highly portable to different graphics systems.

Figure 3:
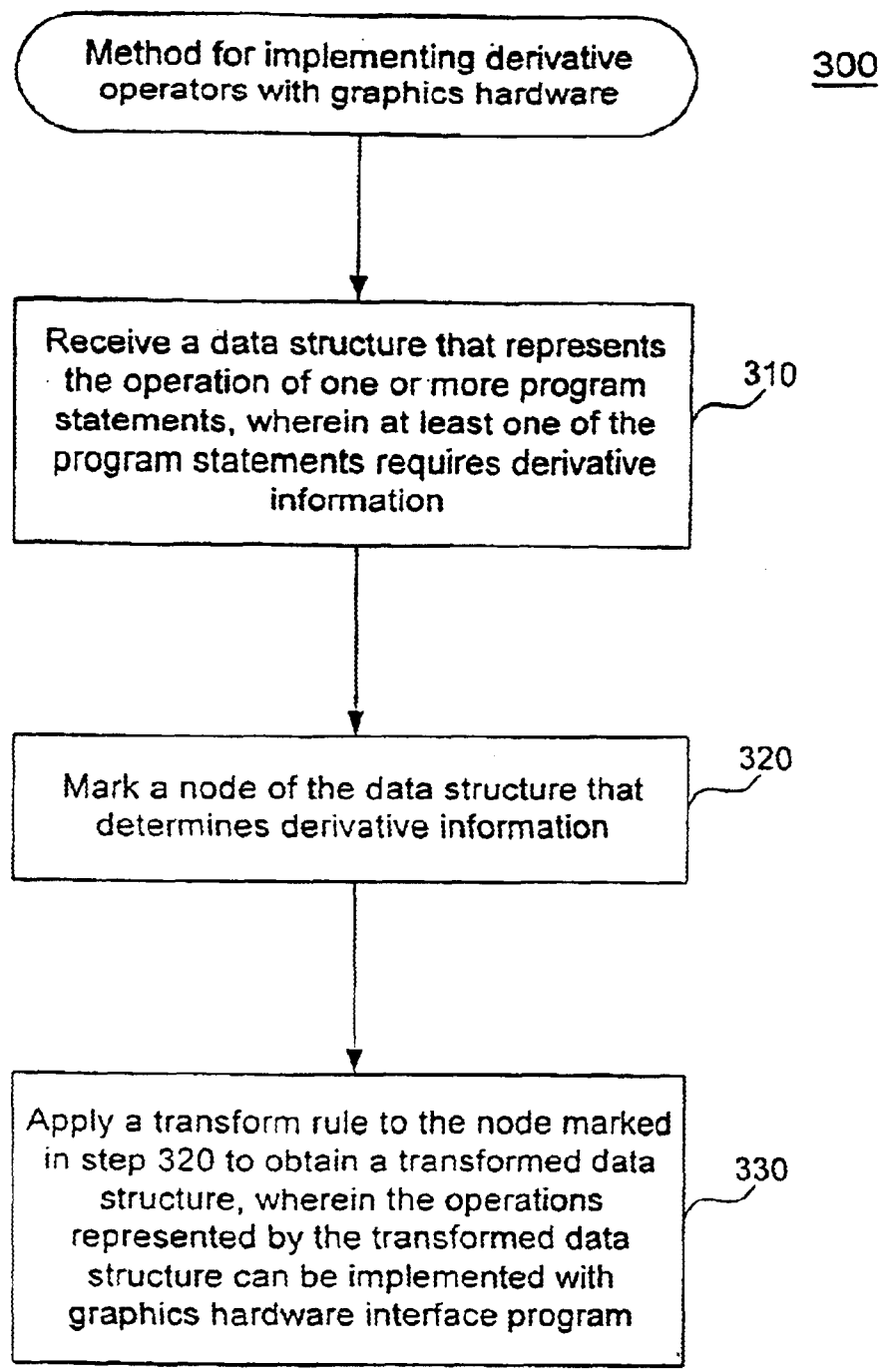
FIG. 3 illustrates a flowchart of a method for implementing derivative operators with graphics hardware according to an embodiment of the present invention.

Example Method for Implementing Derivative Operators According to the Present Invention FIG. 3 illustrates a flowchart of a method 300 for implementing derivative operators with graphics hardware according to an embodiment of the present invention. Method 300 comprises steps 310, 320, and 330. Method 300 is described with regard to FIGS. 4–7.

Figure 4:
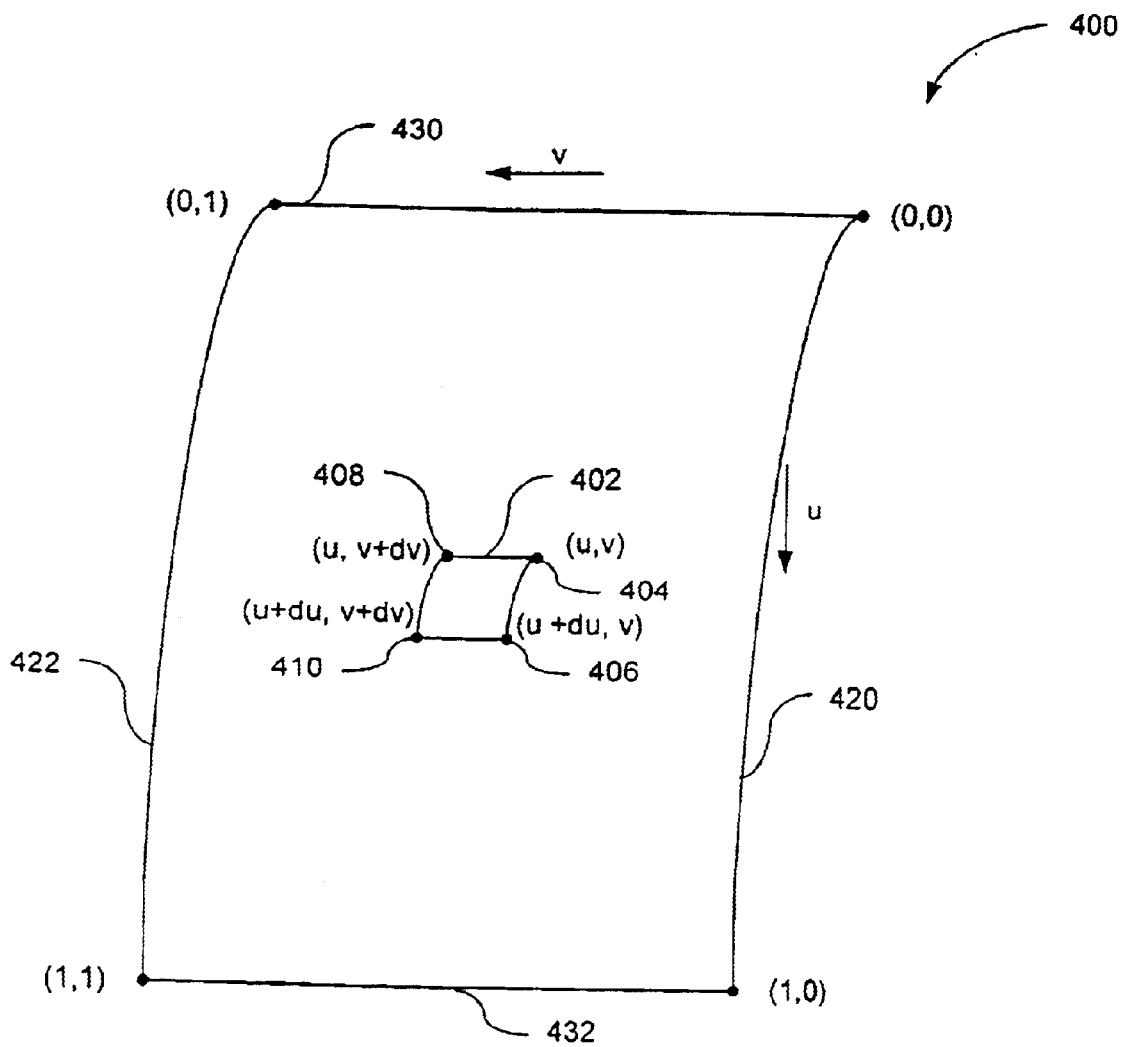
FIG. 4 illustrates an example parametric patch primitive in accordance with the present invention.

Referring to FIG. 4, an example parametric patch primitive 400 having a small surface area 402 is illustrated. Parametric patch primitive 400 comprises a plurality of pixels, for example pixels 404,406,408, and 410 that makeup small surface area 402. Parametric patch primitive 400 is topologically rectangular, and it has two pairs of opposite sides, called its parametric directions, which are denoted by u and v. Sides 420 and 422 comprise parametric direction u. Sides 430 and 432 comprise parametric direction v. Parametric patch primitives are curved and can be connected with smooth continuity. Thus, parametric patch primitives are useful for approximating other primitives, and they can be used to describe very complex objects, as would be known by a person skilled in the relevant art given the discussion herein. A key feature of parametric patch primitives is that they have rectangular parametric spaces, which make them relatively easy to texture map.

As would be known to a person skilled in the relevant art given the discussion herein, it is desirable that an object created using parametric patch primitive 400 and rendered for display appear as realistic to a viewer as possible. In order to accomplish this feat, it is necessary to obtain derivative values for parametric patch primitive 400 in both the u and v parametric directions. For example, it is necessary to compute derivative values for parametric patch primitive 400 in both the u and v parametric directions in order to estimate the size of a filter size needed to antialias a texture applied to parametric patch primitive 400 or to determine the normal to small surface area 402. These derivative values are typically obtained using shading language statements that implement derivative operators.

A typical shading language statement that implements derivative operators is a statement that returns a differential area value at a point p. The square root of a differential area is a length, which can be used as an approximation of the amount that a point p changes between adjacent points in a texture. This shading language statement, denoted herein as area(p), is commonly used to estimate the size of a filter that is needed to antialias a texture.

The following shading language procedure or shader (expressed in pseudo-code), for example, would return a differential surface area at a point p, which could then be used to estimate the size of a filter that is needed to antialias a texture:

$$\text{area}(p) := \text{length}((Du(p)*du)\char`\^(Dv(p)*dv))$$

where:
- Du(p) returns the derivative at p in the u parametric direction;
- Dv(p) returns the derivative at p in the v parametric direction;
- Du(p)*du defines the amount that p changes between adjacent shading samples when moving in the u parametric direction;
- Dv(p)*dv defines the amount that p changes between adjacent shading samples when moving in the v parametric direction;
- (Du(p)*du)^(Dv(p)*dv) is the cross-product of the two vectors represented by (Du(p)*du) and (Dv(p)*dv); and
- length ( ) returns the length of a vector.

As would be known by a person skilled in the relevant art, the cross-product of the two vectors produces a third vector that is mutually perpendicular to the two vectors and that has a length equal to the area of the parallelogram formed by the two vectors. This concept can be seen in FIG. 4, by noting that the surface normal at point 404 can be determined by calculating the cross-product of the tangent vector defined by points 404 and 408 and the tangent vector defined by points 404 and 406. The resultant vector would be normal to the surface of parametric patch primitive 400 at point 404, and it would have a length value equal to the area value of small surface area 402.

As would be known to a person skilled in the relevant art given the discussion herein, many shading language statements implement derivative operators. These statements, however, can be expressed using combinations of the derivation operators Du(p), which returns the derivative at p in the u parametric direction, and Dv(p), which returns the derivative at p in the v parametric direction.

As will become apparent to a person skilled in the relevant art given the discussion herein, implementation of the derivative operators Du(p) and Dv(p) in graphics hardware are very similar. Thus, the discussion that follows focuses primarily on implementing Du(p) in graphics hardware. It should be noted however, that the discussion that follows also teaches a person skilled in the relevant art how to use the present invention to implement any shading language statement that implements a derivative operator. More generally, the discussion that follows teaches a person skilled in the relevant art how to implement any derivative operator in graphics hardware, even derivative operators that are not implemented by or associated with a shading language.

Figure 5:
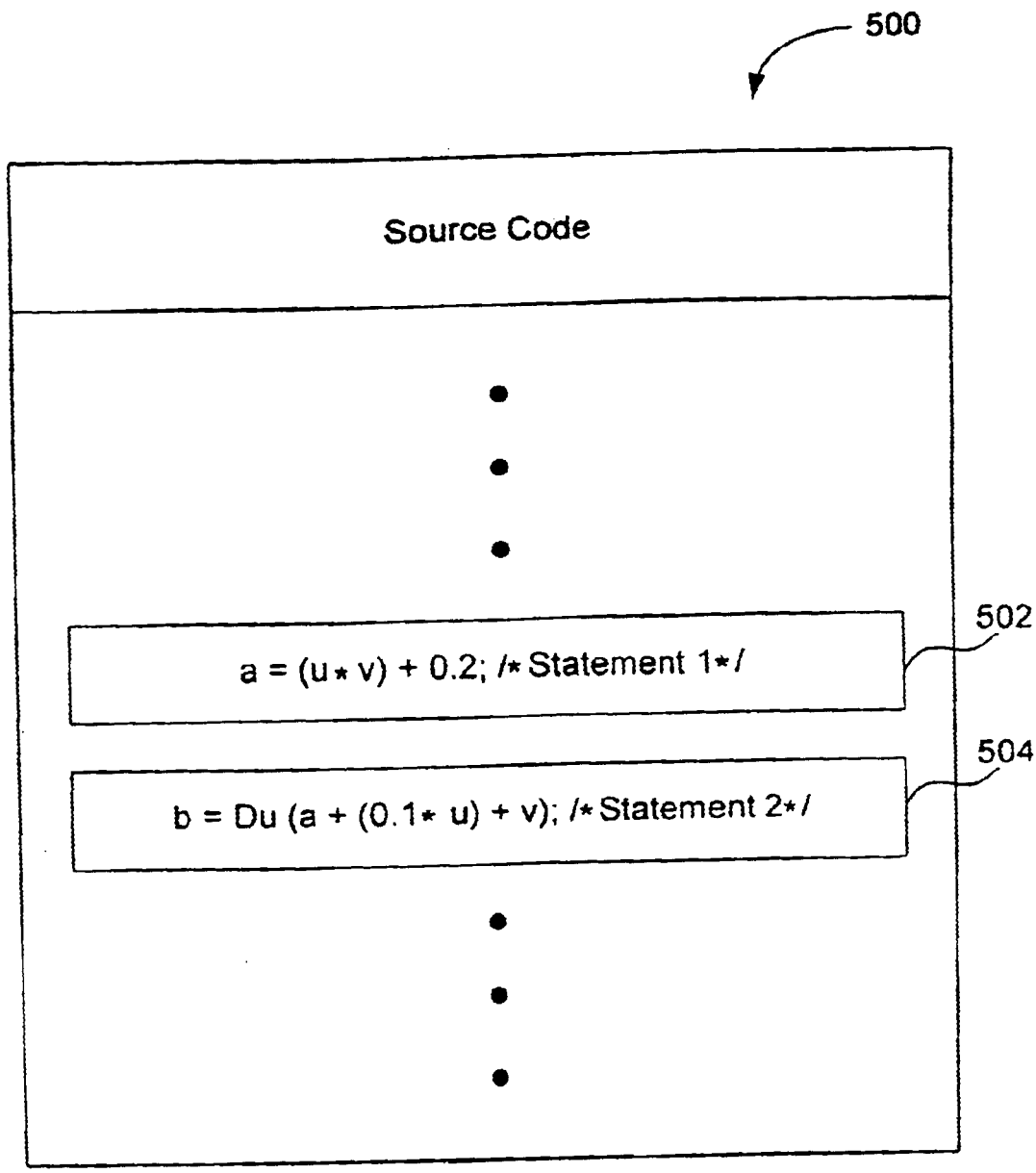
FIG. 5 illustrates an example source code having embedded derivative operators according to an embodiment of the present invention.

FIG. 5 illustrates an example source code 500 having an embedded derivative operator according to an embodiment of the present invention. Source code 500 comprises statements 502 and 504. Statement 502 returns a value "a" that is a function of "u" and "v". Statement 504 returns a derivative value "b", and is referred to herein as a derivative operator.

Referring to FIG. 3, step 310 of method 300 involves receiving a data structure that represents the operation of one or more program statements, wherein at least one of the program statements requires derivative information. As applied to source code 500, statement 504 requires derivative information in order to return a value for "b".

Figure 6:
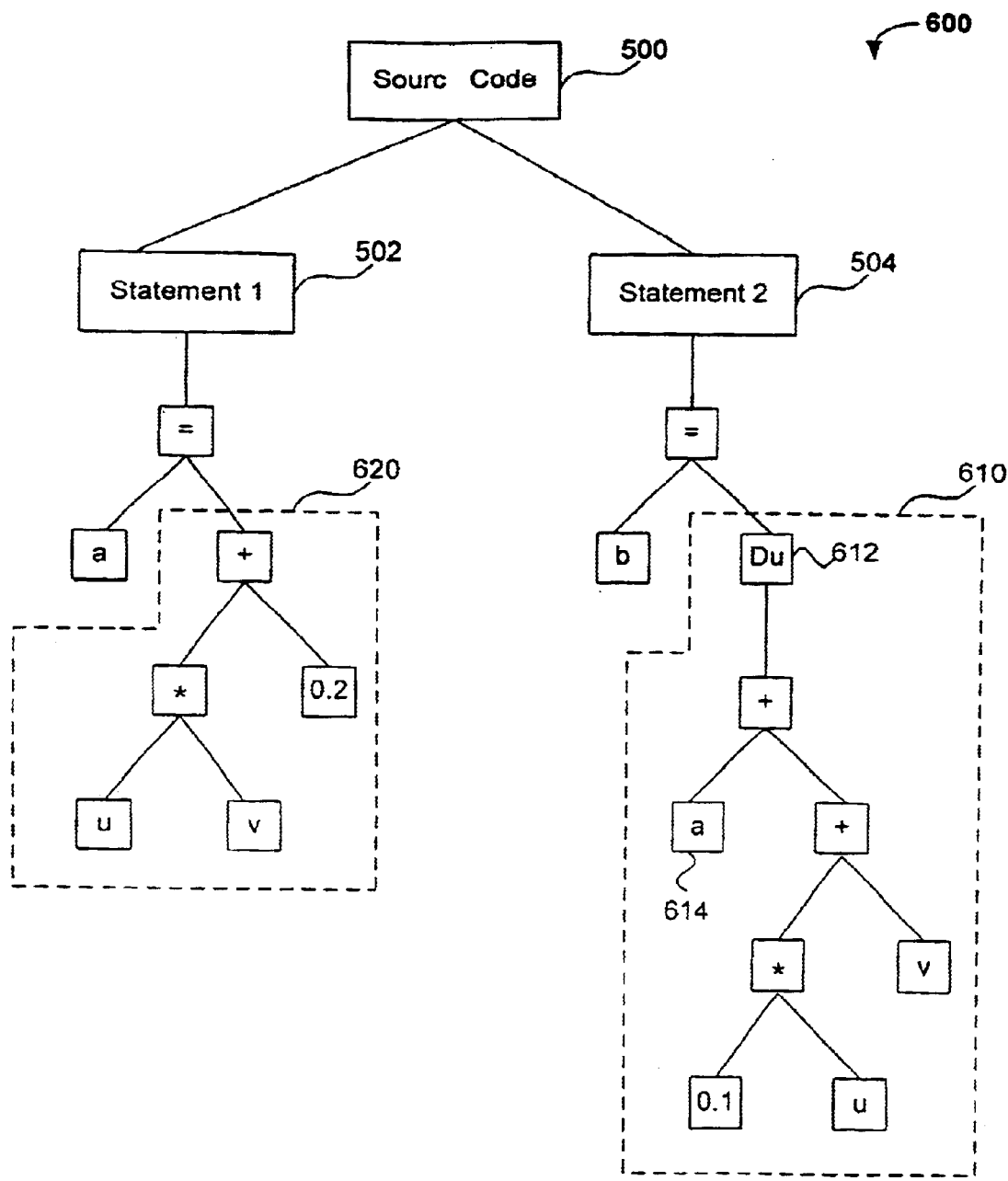
FIG. 6 illustrates an example tree data structure according to an embodiment of the present invention.

FIG. 6 illustrates an example tree data structure 600 for statements 502 and 504 according to the present invention. Tree data structure 600 comprises two substructures 610 and 620. Substructure 610 represents the value of "b", and substructure 620 represents the value of "a". In an embodiment of the present invention, compiler 104 converts source code 500 into a tree data structure. Tree data structure 600 is a part of a larger tree data structure (not shown), which represents all the statements of source code 500.

As can be seen in FIG. 6, the value of "b" is a function of "a", "u", and "v". The value of "b" is determined by implementing structure 610, which is a derivative operator. In order to determine a value for "b", however, it is first necessary to determine a value for "a". The value for "a" is determined by implementing structure 620. As can be seen in FIG. 6, the value of "a", i.e., structure 620, is a function of both "u" and "v".

Referring to FIG. 3 again, in step 320 of method 300, a node of a data structure that determines derivative information is marked. In an embodiment of the invention, this marking is done bottom-up through a tree data structure. When step 320 of method 300 is applied to tree data structure 600, node 612 is marked as a node that requires derivative information. Every node of the larger tree data structure (not shown) that requires derivative information, of which tree data structure 600 is a part, is also marked in step 320.

In an embodiment of the invention, after the nodes in a tree data structure requiring derivative information are marked in accordance with step 320 of method 300, the tree data structure is traversed top-down to identify variables that must be calculated in order to implement the nodes that determine derivative information. For example, a value for node 614 must be provided in order to determine the value of node 612. As can be seen in FIG. 6, this value can be determined using structure 620. A value for "u" and "v" is also needed in order to determine the value of node 612.

As would be known to a person skilled in the relevant art given the discussion herein, it is possible to calculate a derivative value, given a value "u", using the following equation:

$$\frac{F(u+du) - F(u)}{du} \qquad \text{EQ. 1}$$

where:
- F(u) is a specific function evaluated at the value u, and
- u+du is a value at an offset du from u.

Representations of EQ. 1 can be used to form a part of derivative transform rules 202, described above with regard to FIG. 2.

Figure 7A:
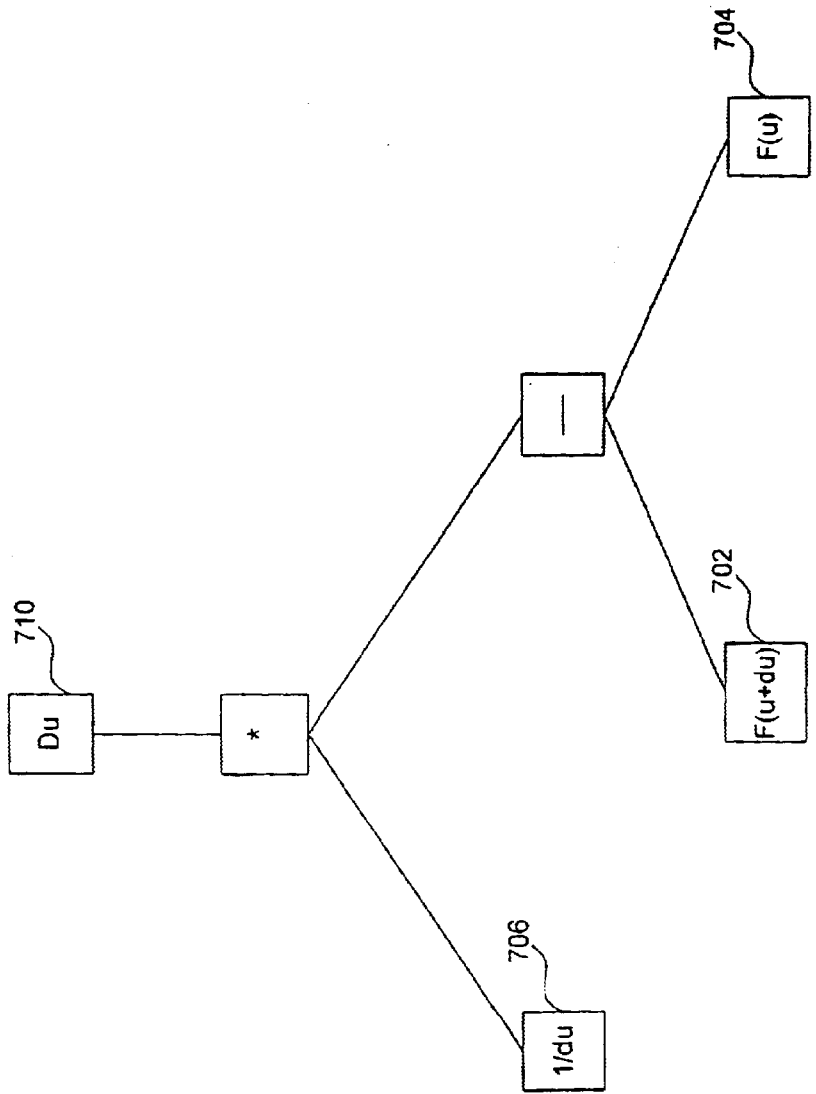
FIG. 7A illustrates an example derivative transform rule according to an embodiment of the present invention.

FIG. 7A illustrates an example derivative transform rule 700 according to an embodiment of the present invention. Derivative transform rule 700 is a tree data structure representation of EQ. 1. As can be seen in FIG. 7A, derivative transform rule 700 comprises nodes 702, 704, 706, and 710. In order to determine a derivative value at node 710, derivative transform rule 700 requires a value for F(u+du) at node 702, a value for F(u) at node 704, and a value for du at node 706.

In an embodiment of the present invention, derivative transform rule 700 is applied to source code 500 using compiler 104. In this embodiment, source code 500 is provided as the input 204 to compiler 104. Compiler 104 then transforms source code 500 into a tree data structure, similar to that illustrated in FIG. 6. Compiler 104 then applies transform rule 700 to obtain a transformed tree data structure (not shown) that can be implemented with multiple passes through a graphics pipeline.

Figure 7B:
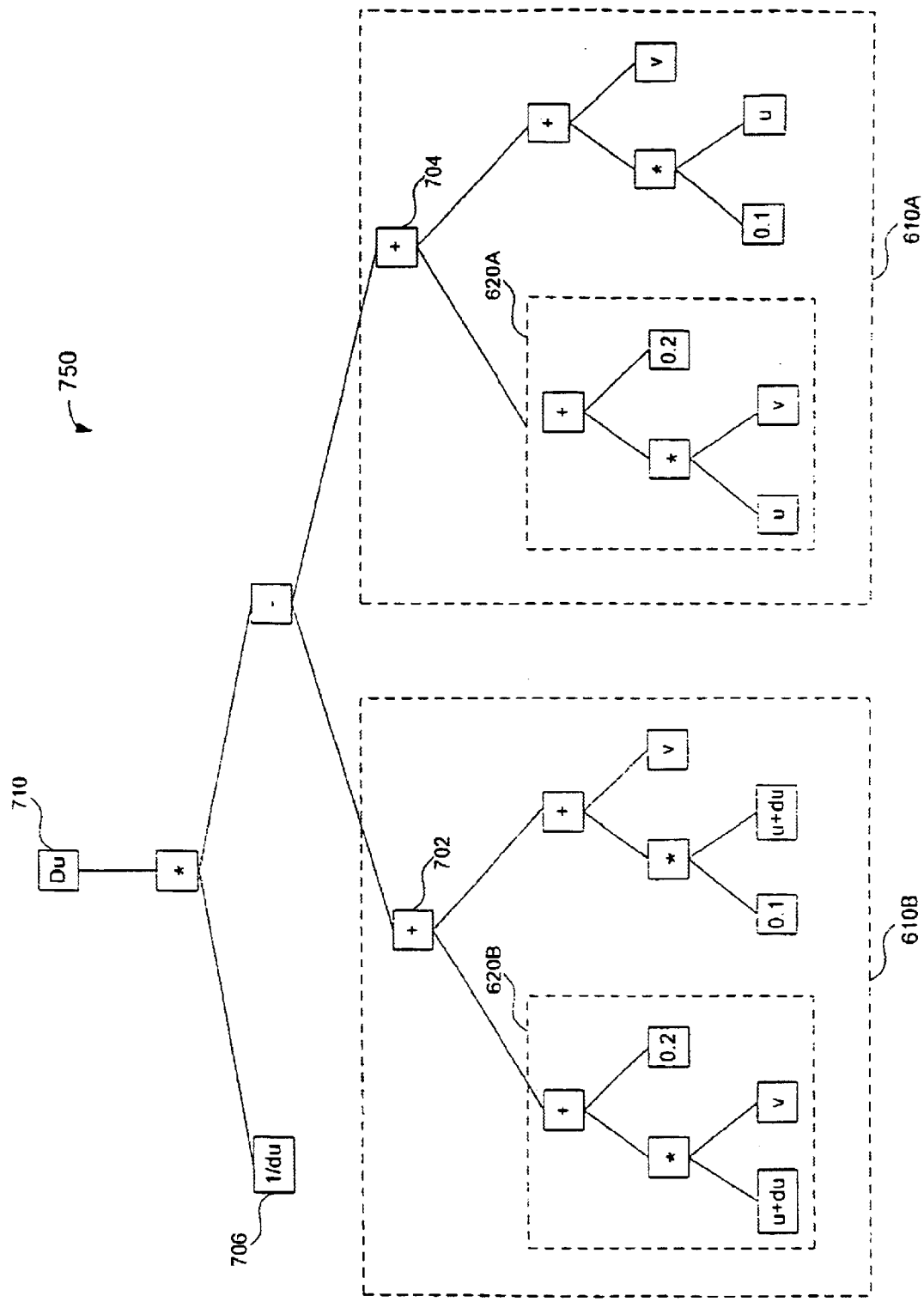
FIG. 7B illustrates an example transformed tree data structure according to an embodiment of the present invention.

FIG. 7B illustrates an example application of derivative transform rule 700 to node 612 of tree data structure 600 according to an embodiment of the present invention. As described above, node 612 is marked in step 320 of method 300 as a node that determines derivative information. According to an embodiment of the present invention, applying derivative transform rule 700 to the tree data structure 600 results in node 710 of tree data structure 750 being coupled to node 612 of tree data structure 600, i.e., tree data structure 750 replaces substructure 610 in FIG. 6.

In an embodiment of the present invention, several steps are taken to generate tree data structure 750. For example, in an embodiment, compiler 104 first marks node 612 of tree data structure 600 as a node that determines derivative information. Compiler 104 then determines that derivative transform rule 700, which is a part of derivative transform rules 202, should be applied to node 612 to generate a tree data structure that can be implemented with graphics hardware.

In creating the tree data structure 750, illustrated in FIG. 7B, compiler 104 generates a first and second copy, 610A and 610B, of substructure 610 and a copy of the tree data structure 750. The first copy 610A of substructure 610 is coupled to node 704 of the copy of the tree data structure of FIG. 7A. The second copy 610B of substructure 610 is coupled to node 702 of the copy of the tree data structure of FIG. 7A. As illustrated in FIG. 7B, compiler 104 replaces the nodes 614 of first and second copies 610A and 610B of substructure 610 with a first and second copy 620A and 620B of substructure 620. Finally, compiler 104 substitutes a value "u+du" for each value of "u" in the copy 610B of substructure 610 and determines a value 1/du for node 706, which results in tree data structure 750. As can be seen in FIG. 7B, once derivative transform rule 700 has been applied to tree data structure 600, the resulting transformed tree data structure 750 can be implemented using arithmetic operations. As would be known to a person skilled in the relevant art given the discussion herein, arithmetic operations can be implemented with graphics hardware.

As would be known to a person skilled in the relevant art, most arithmetic operations can be performed with graphics hardware using blending operations. A blending operation is an operation according to EQ. 2. that typically involves, for example, combining a first pixel with a second pixel, which is stored in a frame buffer, to obtain a resultant pixel that is typically stored the frame buffer.

$$P_{Result} = P_{First} \cdot (bf_1) + P_{Second} \cdot (bf_2) \quad \text{EQ. 2}$$

where:

$P_{Result}$ is a resultant pixel;

$P_{First}$ is a first pixel;

$P_{Second}$ is a second pixel; and $bf_1$ and $bf_2$ are predetermined blending factors.

Blending operations in graphics hardware are typically implemented using a hardware interface or graphics API such as, but not limited to, OPENGL. For example, the frame buffer blending mode of OPENGL supports the arithmetic operations of addition, subtraction, and multiplication, as well as other operation. A divide operation can also be implemented as multiplication by a reciprocal. More complex operation can also be implemented using combinations of the above arithmetic operations and other operations supported by graphics APIs such as OPENGL, as would be known to a person skilled in the relevant art given the discussion herein. For example, a dot product of two vectors can be computed in graphics hardware using component-wise multiplication followed by a pixel copy with a color matrix that sums three resultant vector components together.

In an embodiment of the present invention, tree data structure 750 is implemented with graphics hardware by transforming the nodes of tree data structure 750 into one or more passes through a graphic pipeline using a graphics API. As described herein, a graphics API supports operations that can be used to implement each node of a data structure transformed according to the present invention. How this is done would be known to a person skilled in the relevant art given the discussion herein.

Figure 8:
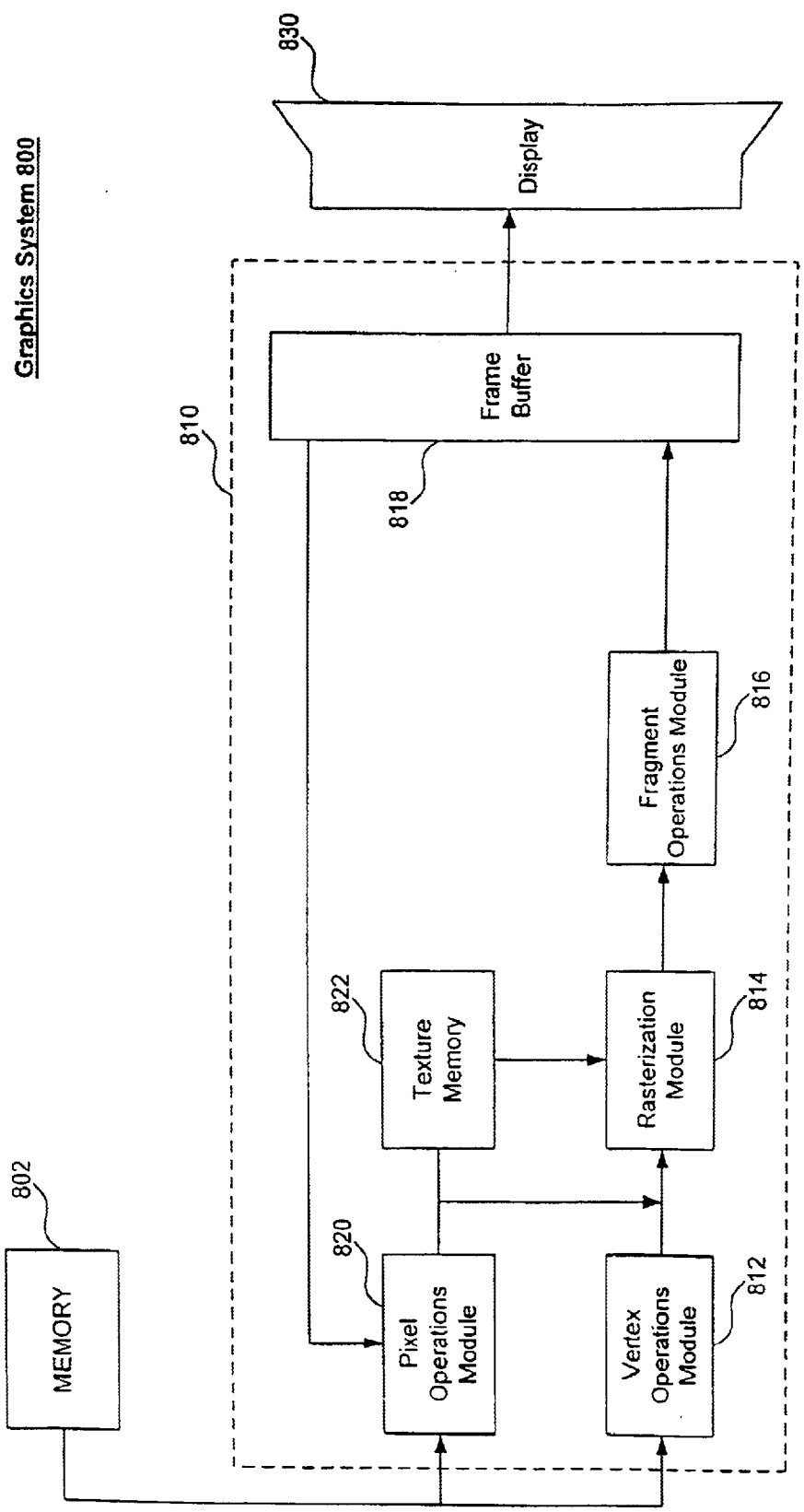
FIG. 8 illustrates an example graphics system according to an embodiment of the present invention.

Example Graphics System for Implementing Derivative Operators According to the Present Invention FIG. 8 illustrates an example graphics system 800 that can be used to implement the present invention. Graphics system 800 comprises a memory 802, a graphics pipeline 810, and a display 830.

Graphics system 800 includes a memory 802, preferably random access memory (RAM), and can also include secondary memory. Memory 802 is used, for example, to store application programs, graphics toolkits software, and graphics API software, in a manner that would be known to a person skilled in the relevant art given the discussion herein. Memory 802 can be similar to main memory 908 and secondary memory 910, described below with regard to FIG. 9.

Graphics pipeline 810 comprises a vertex operations module 812, a rasterization module 814, a fragment operations module 816, a frame buffer 818, a pixel operation module 820, and a texture memory 822. Most graphics pipelines will have some or all of the features of graphics pipeline 810. Not all of the features of graphics pipeline 810 are necessary, however, to implement the present invention, as would be understood by a person skilled in the relevant art given the discussion herein.

Vertex operation module 812 converts parametric data used to represent an image into data that can be used to display an image. A primary function of vertex operation module 812 is to transform spatial coordinates (i.e., coordinates defined in an object or image coordinate system) to screen coordinates. As would be apparent to a person skilled in the relevant art, geometric curves and surfaces of an image can be mathematically represented by just a few parameters or control points. It is therefore desirable to represent an image using only a limited number of representative parameters rather than the many different line segments and polygons that actually makeup an image. Representing an image by just a limited number of representative parameters allows an image to be stored in memory 802 using less memory, and it simplifies programming. The limited number of parameters used to represent an image, however, must be transformed into the actual line segments and polygons that makeup an image before an image can be displayed to a user. This conversion is performed by vertex operation module 812.

Rasterization module 814 combines the output of vertex operation module 812 and pixel operation module 820 to form image fragments. Image fragments correspond to pixels in frame buffer 818. Image fragments have both color values, such as red, green, blue, and alpha, and a depth value, as would be known to a person skilled in the relevant art.

Fragment operation module 816 operates on the fragments generated in rasterization module 814. For example, fragment operation module 816 determines which fragments from rasterization module 814 will be place in frame buffer 818. This determination is based on the various depths of the fragments generated by rasterization module 814. A fragment that is hidden behind an opaque fragment will not be stored in its corresponding pixel location of frame buffer 818 because a hidden fragment cannot not be seen by a viewer. An important function of fragment operation module 816 is the blending of the fragments (or pixels) produced by rasterization module 814 with the pixels of an image stored in frame buffer 818. This blending function can be used, for example, to perform arithmetic operations and thus implement derivative operators.

Frame buffer 818 represent any memory used to store the pixels of a digital image. Frame buffer 818 can be memory located on a display card (not shown), or it can be a portion of processor memory (not show). The purpose of frame buffer 818 is to store an image for display.

The function of pixel operation module 820 is to add a variety of detailed effects to an image. For example, pixel operation module 820 can add texture effects to an image to simulate lighting and surface material properties. Pixel operation module 820 can add effects to images received from either memory 802 or frame buffer 818. Texture memory 822 is used to store, for example, textures that are applied to the surfaces of the objects generated by vertex operations module 812.

Display 830 is any display hardware capable of displaying an image, or a series of images, to a user. For example, display 830 can be a cathode-ray tube display, an active matrix display, or a liquid crystal display. Other types of displays that can be used will be known to a person skilled in the relevant art. Display 830 is used to display an image, or series of images, stored in frame buffer 818.

As described herein, the present invention can be implemented on a large number of graphics systems. Thus, graphics system 800 is illustrative and not intended to limit the present invention. Additional graphics systems that can be used to implement the present invention will be known to a person skilled in the relevant art given the discussion herein.

Figure 9:
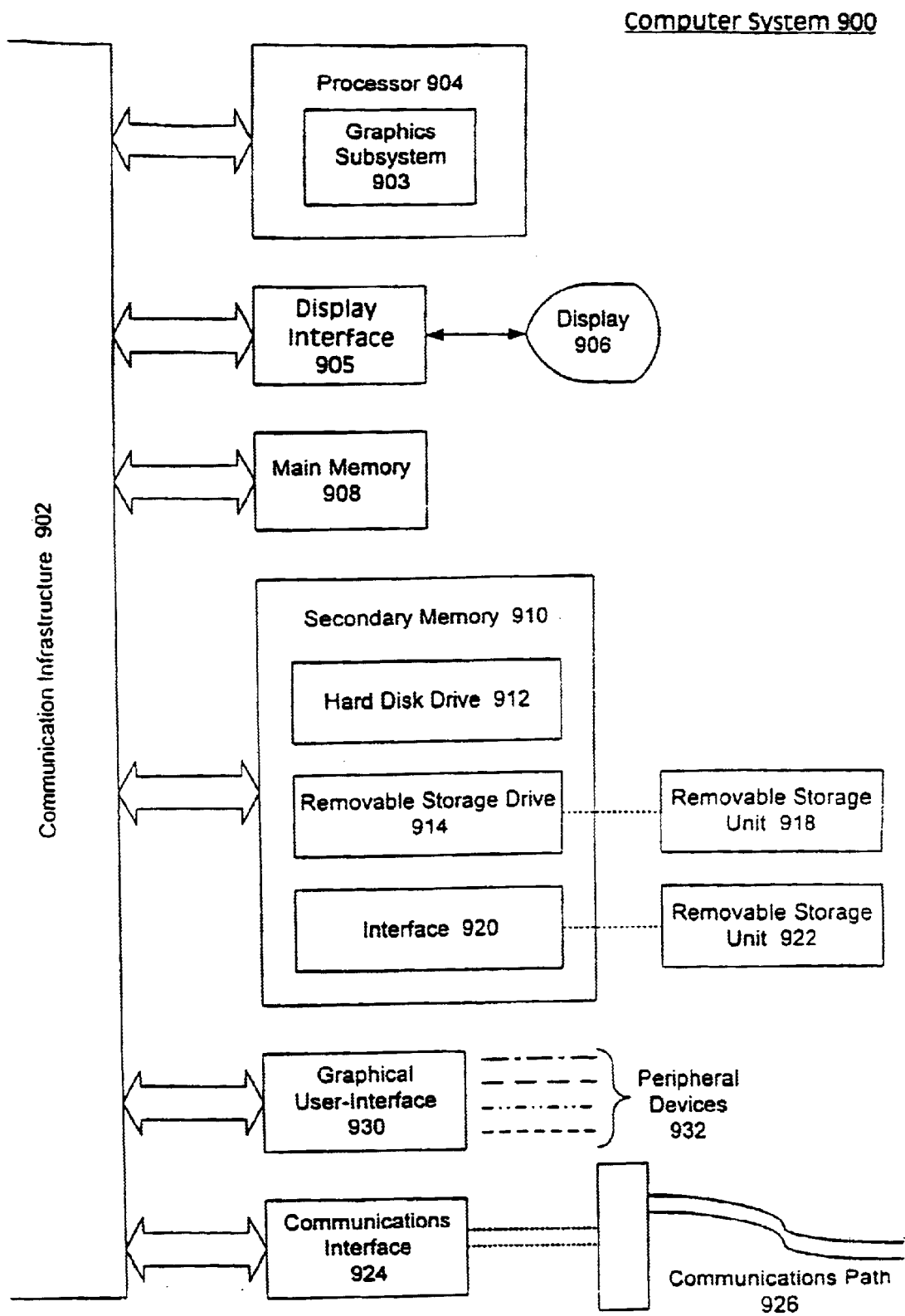
FIG. 9 illustrates an example computer system that can implement embodiments of the present invention.

Example Computer System for Implementing Computer Program Product Embodiments of the Invention Referring to FIG. 9, an example of a computer system 900 is shown, which can be used to implement computer program product embodiments of the present invention. This example computer system is illustrative and not intended to limit the present invention. Computer system 900 represents any single or multi-processor computer. Single-threaded and multi-threaded computers can be used. Unified or distributed memory systems can be used.

Computer system 900 includes one or more processors, such as processor 904, and one or more graphics subsystems, such as graphics subsystem 903. One or more processors 904 and one or more graphics subsystems 903 can execute software and implement all or part of the features of the present invention described herein. Graphics subsystem 903 can be implemented, for example, on a single chip as a part of processor 904, or it can be implemented on one or more separate chips located on a graphic board. Each processor 904 is connected to a communication infrastructure 902 (e.g., a communications bus, crossbar, or network). After reading this description, it will become apparent to a person skilled in the relevant art how to implement the invention using other computer systems and/or computer architectures.

Computer system 900 also includes a main memory 908, preferably random access memory (RAM), and can also include secondary memory 910. Secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

In an embodiment, computer system 900 includes a display interface 905 and a display 906. Display interface 905 is in electrical communication with graphics subsystem 903 and display 906. In an embodiment, display interface 905 comprises a frame buffer that stores an image. Display interface 905 enables an image processed by graphics subsystem 903 to be displayed to a user on display 906.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Computer system 900 can include one or more peripheral devices 932, which are coupled to communications infrastructure 902 by graphical user-interface 930. Example peripheral devices 932, which can from a part of computer system 900, include, for example, a keyboard, a pointing device (e.g., a mouse), a joy stick, and a game pad. Other peripheral devices 932, which can form a part of computer system 900 will be known to a person skilled in the relevant art given the discussion herein.

The present invention can be implemented using software running (that is, executing) in an environment similar to that described above with respect to FIG. 9. In this document, the term "computer program product" is used to generally refer to removable storage unit 918, a hard disk installed in hard disk drive 912, or a carrier wave or other signal carrying software over a communication path 926 (wireless link or cable) to communication interface 924. A computer useable medium can include magnetic media, optical media, or other recordable media, or media that transmits a carrier wave. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. Alternatively, the computer program product may be downloaded to computer system 900 over communications path 926. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

Various embodiments of the present invention have been described above, which are independent of image complexity and are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for implementing derivative operators; comprising the steps of:
    (a) receiving a data structure that represents the operation of one or more computer program statements that requires derivative information, and transforming the data structure into a first data tree having at least one substructure that is implemented with arithmetic operations;
    (b) generating first and second copies of said at least one substructure;
    (c) inserting the first and second copies into a second data tree corresponding to a transform rule;
    (d) marking a node of the first data tree that determines derivative information by:
        (i) traversing the tree data structure to identify one or more nodes that determine a derivative value; and
        (ii) marking at least one node identified in step (c)(i) as determining a derivative value; and
    (e) applying the second data tree to the node marked in step (d) to obtain a transformed data structure, wherein the operations represented by the transformed data structure can be implemented with graphics hardware interface program statements.

2. The method of claim 1, wherein step (d) comprises the step of marking in parallel nodes associated with two or more types of derivative operation programming statements.

3. The method of claim 1, wherein step (d) further comprises the step of:
    (iii) marking a variable of the tree data structure that serves as an input to a node marked in step (d) (ii).

4. The method of claim 1, further comprising the step of performing steps (a) through (e) using a compiler.

5. The method of claim 4, further comprising the step of performing steps (a) through (e) at an interactive rate.

6. A system for implementing derivative operators; comprising:
    means for receiving a data structure that represents the operation of one or more computer program statements that requires derivative information, and transforming the data structure into a first data tree having at least one substructure that is implemented with arithmetic operations;
    means for generating first and second copies of said at least one substructure;
    means for inserting the first and second copies into a second data tree corresponding to a transform rule;
    means for marking a node of the data structure that determines derivative information and traversing the first tree data structure to identify each node that determines a derivative value; and
    means for applying the second data tree to the node marked by said means for marking to obtain a transformed data structure, wherein the operations represented by the transformed data structure can be implemented with graphics hardware interface program statements.

7. The system of claim 6, wherein said means for marking comprises means for marking in parallel nodes associated with two or more types of derivative operation programming statements.

8. The system of claim 6, wherein said means for marking is a compiler.

9. The system of claim 8, wherein said compiler replaces at least one node of said tree data structure with a graphics hardware interface program statement.

10. The system of claim 6, further comprising a graphics hardware interface program.

11. The system of claim 10, further comprising a graphics hardware pipeline.

12. The system of claim 11, wherein said graphics pipeline comprises:
    a vertex operations module;
    a pixel operations module;
    a rasterization module coupled to said vertex operations module and said pixel operations module;
    a texture memory coupled to said pixel operations module and said rasterization module;
    a fragment operation module coupled to said rasterization module; and
    a frame buffer coupled to said fragment operation module and said pixel operations module.

13. A computer program product comprising a computer useable medium having computer program logic recorded thereon for enabling a processor to implementing derivative operations of a shading program language in graphics hardware, said computer program logic comprising:

a receiving procedure that enables the processor to receive a data structure that represents the operation of one or more computer program statements, and transform the data structure into a first data tree having at least one substructure that is implemented with arithmetic operations, wherein at least one of the computer program statements requires derivative information;

a generating procedure that enables the processor to generate first and second copies of said at least one substructure;

an insertion procedure that enables the processor to insert the first and second copies into a second data tree corresponding to a transform rule;

a marking procedure that enables the processor to mark a node of the data structure that determines derivative information by traversing the first tree data structure to identify one or more nodes that determine a derivative value; and a transformation procedure that enables the processor to apply the second data tree to the node marked by said marking procedure to obtain a transformed data structure having at least one substructure that is implemented with arithmetic operations, wherein the operations represented by the transformed data structure can be implemented with graphics hardware interface program statements.

14. The computer program product of claim 13, further comprising a procedure that enables the processor to mark a variable of the tree data structure that service as an input to a node marked by said marking procedure.

* * * * *